United States Patent [19]

Ruyak

[11] 4,296,912

[45] Oct. 27, 1981

[54] MAGNETICALLY ACTUATED METERING VALVE

[75] Inventor: Robert F. Ruyak, Erie, Pa.

[73] Assignee: Autoclave Engineers, Inc., Erie, Pa.

[21] Appl. No.: 71,014

[22] Filed: Aug. 30, 1979

[51] Int. Cl.³ ............................................. F16K 31/08
[52] U.S. Cl. ..................... 251/65; 251/122; 308/139
[58] Field of Search ............... 251/65, 130, 133, 134, 251/122, 282, 129; 308/139; 335/306

[56] References Cited

U.S. PATENT DOCUMENTS

| | | | |
|---|---|---|---|
| 2,289,574 | 7/1942 | Carlson | 251/65 |
| 2,346,904 | 4/1944 | Carlson | 251/65 |
| 2,589,188 | 3/1952 | DeCraene et al. | 251/65 |
| 2,644,477 | 7/1953 | King | 251/65 |
| 2,792,194 | 5/1957 | Huck | 251/65 |
| 3,269,698 | 8/1966 | Koch | 251/214 |
| 3,347,262 | 10/1967 | Gibson | 251/133 |
| 3,355,140 | 11/1967 | Andersen | 251/65 |
| 3,428,291 | 2/1969 | Callahan, Jr. et al. | 251/122 |
| 3,680,831 | 8/1972 | Fujiwara | 251/134 |
| 3,747,892 | 7/1973 | Gigantino et al. | 251/65 |
| 3,774,878 | 11/1973 | Martinez | 251/65 |
| 3,908,959 | 9/1975 | Fichtner | 251/134 |
| 4,047,695 | 9/1977 | Cleveland et al. | 251/122 |
| 4,064,908 | 12/1977 | Loe | 251/122 |
| 4,106,825 | 8/1978 | Ruyak | 308/139 |

FOREIGN PATENT DOCUMENTS

| | | | |
|---|---|---|---|
| 642353 | 8/1950 | United Kingdom | 335/306 |
| 697051 | 9/1953 | United Kingdom | 335/306 |

Primary Examiner—Martin P. Schwadron
Assistant Examiner—G. L. Walton
Attorney, Agent, or Firm—Webb, Burden, Robinson & Webb

[57] ABSTRACT

This invention relates to a shifting stem metering valve that is magnetically actuated. A driven magnet assembly is rotatably supported in a nonmagnetic pressurizable bonnet fixed to the main valve body. The driven magnet assembly preferably comprises rare earth cobalt magnets defining an even number of north and south poles. A cylindrical holder coaxial with and surrounding said tubular bonnet is rotatably secured thereto. The holder carries driving magnets, preferably rare earth cobalt magnets with an even number of north and south poles. Rotation of the holder results in rotation of the driven magnet assembly. A stepping motor or the like controls the rotation of the driven magnet assembly. A valve stem is connected to the driven magnet assembly in a manner such that turning of the driven magnet assembly shifts the stem which in turn adjusts the valve opening.

1 Claim, 2 Drawing Figures

MAGNETICALLY ACTUATED METERING VALVE

BACKGROUND

This invention relates to shifting stem metering valves that usually do not seat. Metering valves, especially when used in process control applications, must continually modulate or throttle flow with frequent position changes required of the actuating and metering elements of the valve. These valves have a metering passage that connects an inlet and an outlet passage. The metering passage is arranged to receive a tapered metering element. Extending away from the tapered metering element is a valve stem that is actuated axially to enlarge or decrease the area of the metering passage. Of course, an actuator passage must be provided in the valve body extending away from the metering passage. In conventional valve designs, the valve stem extends through the valve body and is actuated by elements connected to it outside of the valve body. The stem is surrounded by a ring or rings of packing that maintain the pressure within the valve.

This invention relates to magnetically actuated packless valves for high pressure applications. A related patent that pertains to a magnetically actuated valve, but not especially for high pressure applications, is U.S. Pat. No. 2,289,574. A more or less typical packed rising stem valve is illustrated in U.S. Pat. No. 3,269,698. Aspects of this invention relate to my own U.S. Pat. No. 4,106,825.

Shifting stem metering valves used in control applications (that is, where the stem is continuously being moved in response to process conditions, etc.) are typically designed such that the stem slides back and forth in the packing within a very short distance and/or the stem rotates no more than about one revolution during maximum axial travel. This limited movement of the stem protects the packing but is a limitation on the configuration of the metering orifice and the tapered metering element which cooperates therewith.

The known advantage of magnetically actuated valves is the elimination of the stuffing box or packing which has always been a drawback. Elimination of the stuffing box or packing is particularly desirable in the case of control valves in which the actuating element is frequently moved. However, in the past, magnetically actuated valves have been confined to relatively low pressures if at all used. The principal reason has been that sufficiently strong permanent magnets did not exist that would actuate the magnetic valve through the thick walls required to contain high pressures. Newly available permanent magnets permit the use of thicker walls in the valve housing providing the possibility of magnetically actuated valves for use at high pressures.

It is an object of this invention to provide a magnetically actuated valve for high pressures which will reliably adjust flow at minimal torques (applied by the drive magnets to the driven magnets) even at pressures in excess of 2000 psi. It is a further object to provide a magnetically metering valve that is pressure tight at pressures exceeding 10,000 psi and which can be opened against a sealing pressure of over 10,000 psi. It is a further object to provide a magnetically actuated valve with a value stem turnable through a plurality of revolutions about its axis in moving through its full throttling range.

SUMMARY OF THE INVENTION

Briefly, according to this invention, there is provided a pressurizable (i.e., able to withstand pressures in excess of 2000 psi) valve body defining a fixed diameter metering passage between an inlet fluid passage and an outlet fluid passage. A valve actuator passage extends parallel to the axis of the metering passage. A nonmagnetic tubular pressurizable bonnet is positioned coaxial with the actuator passage. In other words, the bonnet has an extending axis that passes through the metering passage. The bonnet attached to the valve body is in direct fluid communication with the actuator passage and with the inlet passage. A cylindrical holder is rotatably mounted upon the bonnet carrying rare earth cobalt magnets having an even number of north and south poles. A driven magnet assembly carrying rare earth cobalt magnets defining an even number of north and south poles is rotatably supported in the bonnet. Generally, the driving and driven magnets have the same number of magnetic poles with the same angular spacing. Typically the magnets may be cylindrical annular magnets with a plurality of equal spaced circumferential poles. Samarium cobalt is preferred.

A valve stem is positioned in the metering passage and is preferably slidably journaled in a bushing fixed within the actuator passage. The stem has a tapered metering element fixed to it and sized to thus meter flow through the valve by changing the minimum area of the metering passage perpendicular to the direction of flow. The valve stem is associated with the driven magnet assembly such that rotation of the driven magnet assembly in one direction moves the stem to increase the minimum area and rotation of the driven magnet assembly in the other direction moves the stem to decrease the minimum area. The valve is not usually designed to seat.

According to one embodiment, the stem is threadably engaged within a threaded bore on the axis of the driven magnet assembly and is keyed to the valve body to prevent rotation of the stem relative to the valve body. Thus, when the driven magnet assembly is turned, the stem is either drawn into or forced out of the assembly which itself must be secured with thrust bearings within the bonnet.

According to another embodiment, the valve stem has threads that threadably engage threads in the valve body and/or the bonnet. The driven magnet assembly is keyed to the stem such that the stem turns with the assembly. In this embodiment, the assembly may be carried by the stem in which case no thrust bearings are required. Also, the stem may be keyed to the assembly for relative axial movement thus maintaining the alignment of the driving and driven magnets. When the driven magnet assembly turns, it also turns the stem causing it to move axially by the action of the threads that it engages. In a preferred embodiment the threads are on the end of the stem opposite the metering element and enter a threaded bore in an axial end plug in the bonnet. A passage is provided between the interior of the bonnet and the space defined by the threaded end of the stem and the end plug to equalize the pressure therebetween.

THE DRAWINGS

FIG. 1 is an illustration of an embodiment of this invention in which the valve stem threadably engages the driven magnet assembly, and FIG. 2 is an illustration of an embodiment of this invention in which the valve stem threadably engages the top of the bonnet.

DESCRIPTION OF THE PREFERRED EMBODIMENTS

Figure 1:
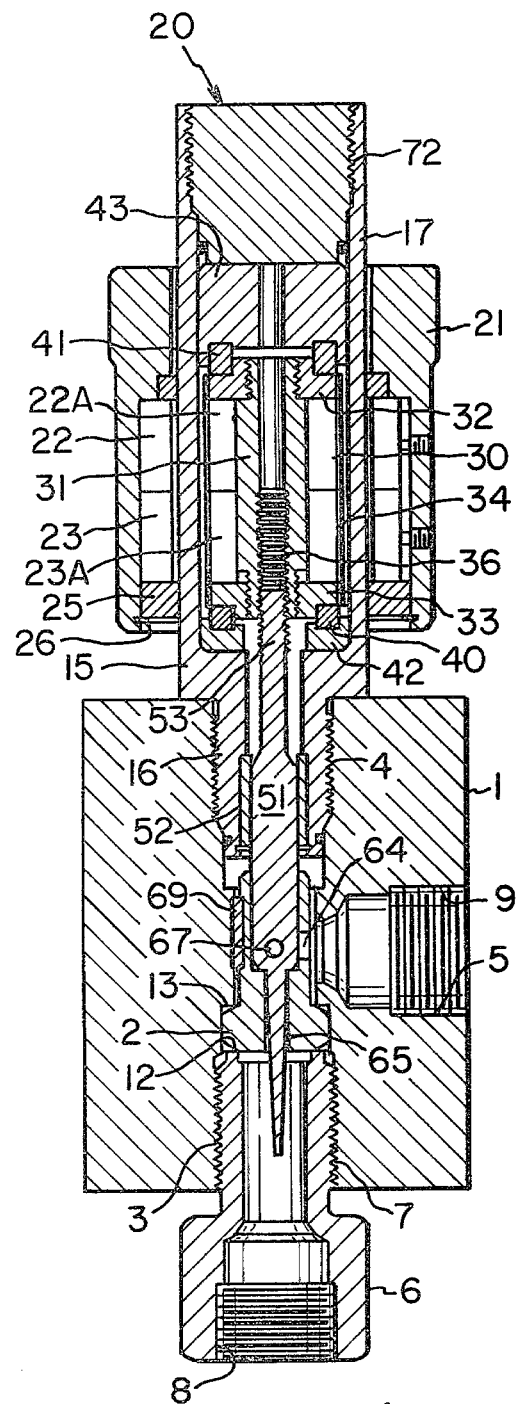

Referring now to FIG. 1, the valve housing or body 1 includes three bores meeting at a central space. A removable fitting 2 defining a constant diameter bore or metering passage is positioned adjacent the intersection of the three bores. In this instance, inlet-outlet bore 3 is aligned with a valve actuator bore 4 both of which are at right angles to inlet-outlet bore 5. Tubular boss 6 defines a passage and has external threads 7 which engage the body 1 to hold the removable metering passage in place. Internal threads 8 on the outer end of boss 6 and threads 9 in the inlet-outlet bore 5 enable the valve to be connected to the remainder of the pressurized system. It should be understood that the inlet and outlet bores may enter the valve body from almost any angle including angles in which they are aligned, and the particular embodiment in which one bore is aligned with the actuator passage is especially for use with a removable fitting defining the metering passage. The valve body 1 and the boss 6 are preferably fabricated from 316 stainless steel or equivalent. The fitting 2 is metal and is an annular piece that is held between the inner end 12 of the boss 6 and the annular rim 13 at the inner end of the bore 3.

Secured to the valve body 1 is a tubular bonnet 15 having a portion 16 of small diameter with external threads for engaging the valve body 1 and a larger diameter portion 17 defining a magnetic drive housing. The bonnet must be a nonmagnetic steel or the like such as austenitic stainless steel. The end of the cylindrical housing of larger diameter has threadably fixed therein an end plug 20.

Surrounding the housing is a drive magnet carrier 21 rotatably secured. The drive magnet carrier has mounted therein rare earth cobalt magnets 22, 23 defining an even number of north and south magnetic poles. Preferably the magnets are annular magnets having an even number of equal angularly spaced circumferential north and south poles. In the embodiment illustrated annular bearings are wedged into the carrier, the bottom bearing 25 being held in place by a snap in retaining ring 26. The bearings are preferably a synthetic polymer material such as polytetrafluoroethylene.

A driven magnet assembly 30 is rotatably mounted within the bonnet 15. The driven magnet assembly comprises a center rod 31 to which are mounted rare earth cobalt magnets 22A, 23A. The magnets are annular and polarize as described above. The driven magnet assembly has axial end caps 32 and 33 threaded to the center rod. A thin nonmagnetic canister 34 extending between the end caps encapsulates the magnets. The end caps have annular portions of smaller diameter extending away from the magnets which are journaled in thrust bearings 40, 41. The thrust bearings are of a synthetic polymer. The thrust bearings are held in place by annular bearing guides 42, 43. The driven magnet assembly may turn freely and is not permitted axial movement.

A valve stem 51 is slidably journaled in a bushing 52 fixed in a central bore in the small diameter portion 16 of the bonnet. The bushing is of a synthetic polymer material and is held against a back rim by a snap ring. The valve stem 51 has an upper (considering the orientation of FIG. 1) threaded end 53 that enters a central threaded bore 36 in the driven magnet assembly. The other end of the stem slidably enters fitting 2. A radial inlet opening 64 in the fitting 2 connects the metering passage with the inlet-outlet passage 5. A small bore portion 65 of the metering passage connects to the inlet-outlet passage of boss 6. The stem has an opening therethrough near the unthreaded end. A pin 67 fixed in the stem 51 slides in a long groove (not shown) in the fitting 2 to prevent rotation of the stem. A keyway is provided on an outer surface of the fitting 2 with a key 69 positioned therein to prevent rotation relative to the valve body. Note that by keying the fitting 2, the stem 51 is also prevented from rotating relative to the valve body as a result of the interaction of the long groove and the pin 67.

In normal operation the valve is adjusted by turning the carrier 21 that in turn causes rotation of the driven magnet assembly 30. The threaded interconnection between the driven magnet assembly and the stem 51 is converted to axial movement of the stem.

The amount of axial movement per revolution of the valve stem, of course, depends upon the number of threads per inch on the stem (i.e., the pitch). Thread pitch may typically vary from 11 to 32. With prior art rising stem valves in which the maximum stem rotation was on the order of sixty degrees, the stem travel was between 0.0052 and 0.0152 inches with thread pitches of 32 and 11 respectively. Thus the metering passage and the tapered metering element of such prior art metering valves were shaped to provide the entire change in the area of the metering passage for one hundred percent control within a very short stem travel. On the other hand, stem rotation and axial travel is no drawback with control valves according to this invention and, therefore, one hundred percent control may take place over a much larger distance, say ¼ to 2 inches. This enables much more precise control. Metering passages and tapered metering elements may be shaped for better flow patterns.

There are available electric motors that can be controlled for positioning to an accuracy of one fiftieth (1/50) of a revolution. Thus, if 100 percent control is based on ten turns of the valve stem, then axial positioning of the stem will be accurate to two tenths of a percent (0.2%).

Figure 2:
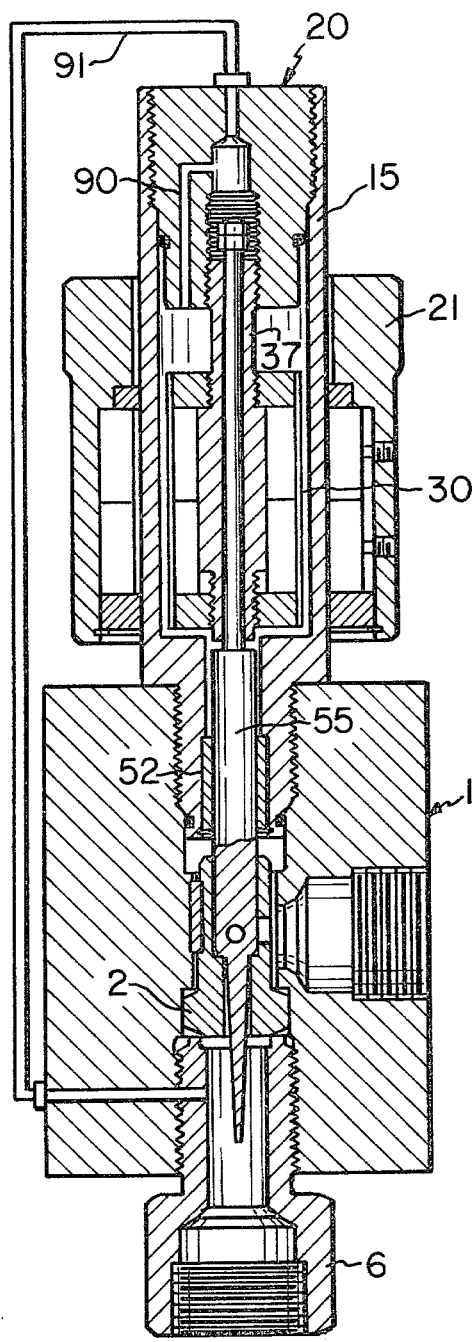

Referring now to FIG. 2, an alternate embodiment is illustrated wherein the stem is indirectly threaded at its end away from the valve seat to the plug 20 of the bonnet. In both FIG. 1 and FIG. 2, like elements carry identical identifying numerals. The stem itself also comprises the metering element. The stem is axially and rotatably fixed to the driven magnet assembly which has a threaded upper extension threaded into the bore on the interior face of the plug 20. When the drive magnet carrier 21 is turned, the drive magnet assembly 30 is turned thus turning the stem 55 and assembly 30 axially up or down depending on the direction of rotation. Preferably the stem is provided with clearances and/or a passage 90 is provided that permits upstream pressure from the inlet passage to act upon the upper axial end of the stem thus aiding in balancing the axial forces on the stem due to the very high internal pressures which may be present in the valve. No matter how the metering passage and tapered metering element are configured, there will exist a pressure drop across the metering area or orifice proportional to the flow therethrough for a given upstream pressure. The thread friction (considering the threads on the stem) may prevent unwanted drift of the stem in response to this pressure drop and/or the control motor may hold the stem in position. The axial thrusts due to this pressure drop can be further minimized by placing both ends of the stem in communication as by an external pressure tube 91. (See FIG. 2).

Referring again to FIG. 2, note that with this embodiment the driven magnet assembly is not mounted in thrust bearings. The axial load is thus carried by the bonnet through metal to metal contact, i.e., through the threads in the bore. Axial forces are not transferred to the bonnet through synthetic polymer bearings.

Having thus defined my invention in the detail and particularity required by the Patent Laws, what is desired protected by Letters Patent is set forth in the following claims.

I claim:

1. A valve suitable for metering fluids pressurized in excess of 2000 psi comprising a pressurizable valve body defining a metering passage, a first fluid passage in communication with one of the metering passage and a second fluid passage in communication with the other end of the metering passage and a valve actuator passage extending away from the metering passage, a nonmagnetic elongate cylindrical tubular pressurizable bonnet having an extending axis passing through the metering passage and in direct fluid communication with the passages in said valve body, a cylindrical holder coaxial with and surrounding said tubular bonnet, said holder mounted rotatably thereto, said holder carrying rare earth cobalt magnets defining an even number of north and south poles, a driven magnet assembly carrying rare earth cobalt magnets defining an even number of north and south poles rotatably supported in the bonnet substantially coaxial with said bonnet by thrust bearings to resist axial movement of the driven magnet assembly, a valve stem substantially coaxial with said bonnet journaled for free axial movement in the valve actuator passage threadably engaging the driven magnet assembly, a tapered metering element fixed to said valve stem which when moved axially enlarges or decreases the minimum area of the metering passage through which flow may take place, means for keying the valve stem to prevent rotation thereof, whereby rotation of said driven magnet assembly in one direction concomitantly raises the valve stem and rotation of said driven magnet assembly in the other direction lowers said valve stem.

* * * * *